United States Patent Office 3,365,310
Patented Jan. 23, 1968

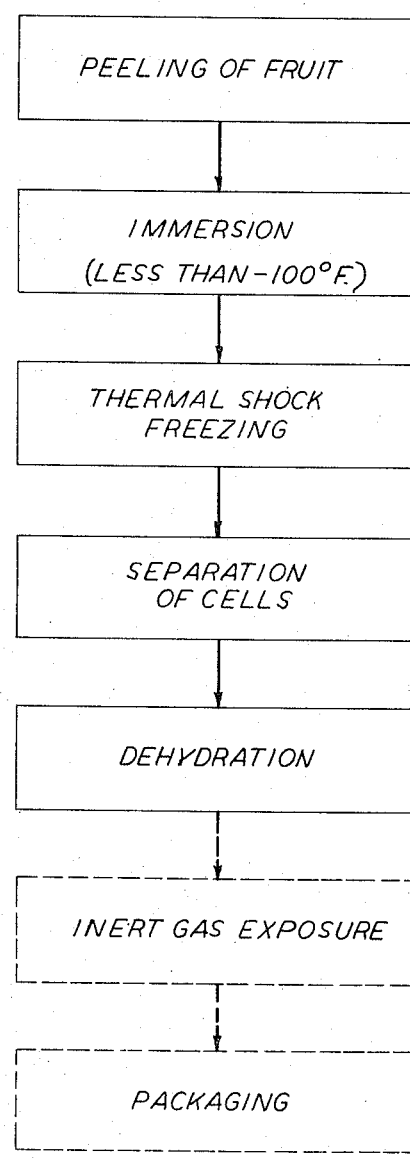

3,365,310
FREEZE-DEHYDRATION OF ORANGE
JUICE CELLS
Robert C. Webster, Madison, Wis., assignor to Air Reduction Company, Incorporated, New York, N.Y., a corporation of New York
Filed July 10, 1964, Ser. No. 381,664
13 Claims. (Cl. 99—204)

ABSTRACT OF THE DISCLOSURE

The invention relates to a novel food product, dehydrated discrete citrus fruit cells and a process for making the same which involves a rapid freezing technique followed by a dehydration step so as to produce the said cells.

---

This invention relates to the treatment of a novel food product in such a manner so that it may be stored for an indefinite period of time without creating any special conditions of storage.

More particularly, this invention relates to the continued treatment of a novel article of food which is the subject of patent application Ser. No. 156,696, now Patent No. 3,246,993 originally frozen by a rapid freezing procedure, producing a dried or dehydrated food product which may be stored simply, efficiently, and substantially permanently.

More particularly, this invention is related to the rapid freezing and subsequent dehydration of citrus fruit cells so as to produce a dehydrated citrus fruit product which is in a substantially permanently preservable state.

Copending patent application Ser. No. 156,696 discloses the flash or rapid freezing of whole citrus fruits so as to produce discrete fruit cells which may be packaged for later use, such as flavoring ice cream, etc. The preparation of discrete citrus fruit cells as the result of flash or rapid freezing is fully disclosed in said copending application, and such disclosure sets forth in detail the preferred manner of obtaining this novel food product, that is discrete citrus fruit cells.

One of the problems in connection with the use of such novel discrete citrus fruit cells as referred to in the preceding paragraph is the maintenance of the stability of said cells during storage. It is most desirable that the discrete citrus fruit cells be able to be packaged in such a manner, for example, as to be stored without special precautions on the grocer's or housewife's shelf, or in the soldier's pack, until utilized. Furthermore, it is desirable to have this novel citrus product be stored over an indefinite period of time, a period of time as great as ten years or more, without deterioration. Such indefinitely long storage would be most useful, for example, for civil defense or space exploration.

Therefore, it is an object of this invention to provide for treatment of a novel food product in such a manner that it may be stored for long periods of time without deterioration.

It is further an object of this invention to provide discrete citrus fruit cells in such a condition that they may be stored for long periods of time.

It is further an object of this invention to provide novel individual citrus fruit cells treated so as to be capable of being packaged and then utilized by the consumer at will, without the necessity of special storage or other precautions, such as refrigeration.

Other objects and advantages of this invention will become more apparent upon review of the following disclosure.

As stated previously, U.S. patent application Ser. No. 156,696 discloses a rapid freezing method of producing a novel food product, that is discrete citrus fruit cells, for example, orange, lemon or grapefruit cells. Generally speaking, according to the invention of the instant application, the discrete citrus fruit cells, while still in a frozen condition, are subjected to subatmospheric pressure at a temperature sufficient to permit the sublimation of water from said cells (the process being known as freeze-dehydration). After sublimation of substantially all the water from said cells, and coincident progressive warming up of said cells, the cells are in a dehydrated state and are stored in such a state for an indefinite period of time, without refrigeration or other special preservation precautions.

The invention is further described more specifically in connection with the accompanying drawing, which drawing is a flow diagram illustrating the different steps in the method of this invention. Further advantages, as well as ramifications, of the invention will become apparent in connection with the following detailed description.

As stated in the above referred to application Ser. No. 156,696, the flash or rapid freezing of citrus fruits, according to the method described in application Ser. No. 156,696, results in a novel citrus fruit product which contains and preserves the juice of the fruit more effectively than those prepared by previously known methods. The flash or rapid freezing of the citrus fruit according to the method described in application Ser. No. 156,696 further results in the separation of the citrus fruit juice sacs or cells from other parts of the fruit and from each other.

The flash or rapid freezing of citrus juice cells according to the method of application Ser. No. 156,696 is especially beneficial since the anatomy of the fruit previously presented unusual difficulty in preserving the fresh fruit flavor. An orange, for example, consists of a soft pithy core, forming a central axis of the fruit, and segments (carpels, locules) distributed around the soft core and covered with an outer peel. Each of the segments is surrounded by a thin wall (carpellary membranes and locular wall) consisting of a tissue of epidermal origin. In the mature fruit there are juice-containing cells or bodies closely compacted in the segments and consisting of club-shaped vesicles. The just referred to vesicles are multicellular in structure and have extremely thin walls of the cells. In addition to containing the juice, the vesicles contain the color-bearing yellow chromatophores. There are oil droplets embedded in the cellular tissue, and these oil droplets have an important bearing on the taste or flavor characteristics of the fruit.

The term "cell" is used herein to designate these juice containing sacs, and the expression "discrete juice cells" in used to designate cells that have been detached from other cells and from the other parts of the fruit without breaking the walls of the cells.

Generally, it is not feasible to separate individually the cells of citrus fruit in any known manner except in accordance with the disclosure of application Ser. No. 156,696. Even attempts to manually pick apart the individual cells is not normally possible, aside from the obvious impracticability of such a mode of operation. This is apparently due to the inherent mechanical characteristics of the cells and of their cohesive structure with one another. Thus, it appears that under normal circumstances the cohesive forces between the adjacent cells are sufficiently great that the strength of the cell walls or membranes defining the cells is not sufficiently great to withstand the forces that would normally have to be applied thereto in order to overcome the cohesion between the cells.

In accordance with the procedure as set forth in application Ser. No. 156,696, and shown in the flow diagram, the mature fruit is first peeled by any of the conventional peeling methods. This leaves some of the pithy lining of the peel on the outside surfaces of the section membranes (carpellary). The peeled fruit is then immersed in an extremely cold liquid, such as nitrous oxide of approximately −128° F., liquid nitrogen of approximately −320° F., or other liquids of comparable low temperatures. The temperature of the liquid used to freeze the fruit should be of cryogenic temperature, that is, a temperature lower than −100° F. The term "immersed" is used herein to designate a covering of the fruit with a liquid for a limited period of time. Ordinarily, the immersion is accomplished by dipping the fruit in the liquid, a number of pieces of fruit can be treated simultaneously by placing them in a wire mesh basket, but it can be accomplished by covering the fruit as a result of spraying liquid on it or by subjecting the fruit to a vapor of cryogenic temperature. The "immersion" referred to may also be a combination of the various freezing media just mentioned. The period of the immersion should be long enough to freeze the fruit to a solid condition; but it can be no longer. A period of nine seconds has been found sufficient with orange sections immersed in nitrous oxide at a temperature of −128° F.

According to that disclosed in application Ser. No. 156,696, when the fruit is withdrawn from contact with the immersion media, it is found to have been shattered by thermal shock, that is, extensive separation of the fruit has taken place, along the segmented walls and between individual juice cells. Sharp, cracking sounds are heard as the fruit is withdrawn from the immersion media into an ambient atmosphere at room temperature. It is theorized that this shattering phenomenon results from thermal shock. The sudden freezing followed by the sudden transferring from the extremely low temperature to a higher temperature contributes to the shattering. Agitation of the shattered sections, while still frozen, causes them to crumble further into individual or discret cells, but the juice cells themselves are not broken and are distinguished from one another. Processing of the fruit while in this frozen condition and with the juice cells intact, permits them to be completely separated from each other and from the pithy material, carpellary membranes, seeds and vascular bundles.

The agitation or separation referred to in the preceding paragraph can be carried out by passing chunks of adhering cells on a belt under resilient rollers or between such rollers. This detaches the juice cells from one another and also from the membranes that cover the sections. The juice cells may then be separated from these carpellary membranes and from the pithy material, seeds and vascular bundles by means of shaking sieve screens that let the juice cells go through them and stop the other parts of the fruit. Other methods of separation can also be used, if desired.

The mass of discrete juice cells is thus made substantially free of other constituents. The frozen cells are then ready for dehydration.

Freeze-dehydration is sometimes referred to as drying by sublimation or drying by lyophilization and may be described generally in the manner set forth hereinafter.

Hereinbefore, the product to be dehydrated has been prefrozen, which results in the formation of countless minute ice crystals throughout the frozen mass. In the past, as described above, the formation of such ice crystals lead to the rupture of the cells of the citrus fruit, thus destroying the value of the fruit. According to the process of this invention, the citrus fruit to be dehydrated has been flash or rapidly frozen, as described above, which avoids cell destruction as the result of ice crystal growth, since the time of freezing and the time for growth of ice crystals is greatly reduced.

The flash frozen citrus fruit product is then dehydrated. It is placed in a vacuum chamber, and, in a high vacuum, water in the product is transformed directly from ice form to a vapor, which is abstracted from the product and collected elsewhere, for example, on refrigerated plates located in the chamber. Controlled heating is applied to the citrus fruit product in the vacuum environment to create a temperature gradient allowing removal of the water from the product. The dried product can then be stored.

It is pointed out that the particular apparatus used for dehydration of the frozen citrus fruit cells is not a part of this invention. Rather, any of the standard dehydration apparatus well known in the art may be utilized, such as the Food Machinery and Chemical Corporation freeze drying equipment known throughout the industry.

The frozen discrete citrus juice cells, in one preferred method of dehydrating, are placed in a vacuum chamber environment below 4 mm. Hg, usually in a batch type arrangement for sixteen or twenty-four hours. The moisture is abstracted from the individual discrete juice cells, from the boundary of ever receding high crystal zones of each cell. The possibility of chemical, enzymatic or microbiological action during drying is remote. Heat is normally conducted to the product during the drying procedure by conduction and radiation. The dehydrated discrete citrus juice cells are dried to a point where approximately 98% or more of the water is removed.

Nitrogen or other inert gases may be used in the dehydration process during the "break back" process. As already stated, the chamber of the freeze dehydrator is under a high vacuum. There has been very little oxidation of the cells, due to the absence of oxygen. The cavities left between sublimating ice crystals are virtually void of air. If the vacuum is broken by "breaking back" with nitrogen or other inert gases, the cavities in the produce will be occupied with said gases and the oxygen included within the product practically negligible. The inclusion of the "breaking back" concept aids in the packaging of the dehydrated discrete citrus fruit cells since oxygen will be practically excluded from the cells. The nitrogen or other inert gas used may be the effluent of the nitrogen or other inert gas previously used during the flash freezing operation described above.

The advantages of freeze-dehydration of citrus fruits by the process described in detail above are numerous. The flash freezing allows for the obtaining of discrete citrus fruit cells without substantial ice crystal growth which then may be dehydrated to produce a novel product, that is, dehydrated discrete citrus fruit cells. The dehydrated discrete citrus fruit cells retain their original size, shape and structure, and may be stored in the dehydrated state for almost indefinite periods of time. The addition of water will produce rapid rehydration of dehydrated citrus fruit cells since the porosity of the dehydrated materials enables a rapid penetration of the water. The dehydrated citrus fruit cell may not only be stored for long periods of time without significant losses of produce quality, but storage of such dehydrated cells in bulk is greatly enhanced by the light weight of such cells after dehydration, since approximately, 98% or more, of the water has been removed. The light weight just referred to, the lack of need of refrigeration, the substantial exclusion of oxygen from the dehydrated cells, the lack of enzymatic change and microbiological growth during drying, and the ease of rehydrating, among other reasons, not only make for ease of storing, but ease of distribution and consumption as well as distinct pleasantness in consumption.

With the simple addition of water, the cells may be used in a multitude of manners, by the housewife, by the soldier in the field, in space exploration, in civil defense, etc. Obviously, the dehydrated cells may be transported for use at a later date in the flavoring of ice cream, cereals, cakes, or any other food desired.

This invention should not be limited by any particular step of the process set forth above or apparatus described in relation to said process, but rather, should be limited only by the following claims:

I claim:

1. The method of preserving citrus fruit which comprises the steps of peeling the fruit, immersing the fruit in a liquid having a temperature at least as low as −100° F. for a period long enough to freeze the fruit to a solid condition, removing the fruit from the liquid and separating the juice cells from the remainder of the fruit, and subjecting the frozen discrete cells to subatmospheric pressure at a temperature sufficient to permit sublimation of water from said cells while said cells remain essentially in the solid state.

2. The method of treating citrus fruits, as described in claim 1, and in which the juice cells are also separated from one another by agitation while in frozen condition.

3. The method of treating citrus fruits, as described in claim 1, and in which the peeled fruit is broken up along divisions between segments of the fruit prior to immersion.

4. The method of preserving citrus fruit as set forth in claim 1 further comprising the step of subjecting the dehydrated cells to an environment of inert gas so as to substantially eliminate oxidation of the cells.

5. The method of preserving citrus fruit as set forth in claim 4, the inert gas being nitrogen.

6. In the preservation of citrus fruit, the improvement which comprises peeling the fruit and shattering apart the peeled fruit by thermal shock produced by dipping the fruit in cold liquid having a temperature at least as low as −100° F., the fruit being left in the liquid long enough to solidify the juice cells, separating the juice cells from pithy portions of the fruit and from each other, and subjecting the separated cells to subatmospheric pressure at a temperature sufficient to permit sublimation of water from said cells while said cells remain essentially in the solid state.

7. The method of preserving citrus fruit as set forth in claim 6 further comprising the step of subjecting the dehydrated cells to an environment of inert gas so as to substantially eliminate oxidation of the cells.

8. The method of preserving citrus fruit as set forth in claim 7, the inert gas being nitrogen.

9. A method of preserving citrus fruit which comprises freezing the fruit in a cryogenic media having a temperature at least as low as −100° F., separating the individual cells of the fruit after freezing, and dehydrating said separated individual cells.

10. A method of preserving citrus fruit as set forth in claim 9 further comprising the step of subjecting the dehydrated cells to an environment of inert gas so as to substantially eliminate oxidation of the cells.

11. A food product consisting of a mass of dehydrated, discrete, unruptured juice cells of a citrus fruit, the mass being substantially free of other constituents of the fruit.

12. The food product described in claim 11 in which said discrete juice cells are substantially devoid of oxygen.

13. The food product described in claim 11 and in which the juice cells are of substantially ripe fruit.

References Cited

UNITED STATES PATENTS

| | | | |
|---|---|---|---|
| 2,978,337 | 4/1961 | Gaeta et al. | 99—206 |
| 3,039,276 | 6/1962 | Morrison | 99—193 X |
| 3,246,993 | 4/1966 | Webster et al. | 99—193 |

OTHER REFERENCES

Tressler et al.: "The Freezing Preservation of Foods," vol. 1, AVI Publ. Co., 1957, pp. 334–5, 347.

HYMAN LORD, *Primary Examiner.*

A. LOUIS MONACELL, *Examiner.*

M. VOET, *Assistant Examiner.*